United States Patent [19]

Stoltzfus

[11] Patent Number: 4,718,811
[45] Date of Patent: Jan. 12, 1988

[54] SILAGE DISTRIBUTOR APPARATUS

[75] Inventor: Henry S. Stoltzfus, Mount Joy, Pa.

[73] Assignee: Lancaster Level FLO, Inc., Lancaster, Pa.

[21] Appl. No.: 820,036

[22] Filed: Jan. 21, 1986

[51] Int. Cl.$^4$ ............................................. B65G 65/00
[52] U.S. Cl. ..................... 414/301; 239/651; 239/665; 239/666; 239/684; 239/689; 340/684
[58] Field of Search ................ 414/293, 294, 299–302, 414/311; 239/651, 655, 656, 684, 689; 406/160–162; 198/535, 536, 640; 901/13, 49; 200/61.39, 61.42, 61.44; 340/671, 684

[56] References Cited

U.S. PATENT DOCUMENTS

| | | | |
|---|---|---|---|
| 1,684,478 | 9/1928 | Dill | 198/640 |
| 1,763,396 | 6/1930 | Howland | 198/535 |
| 2,472,526 | 6/1949 | Frazee | 340/671 X |
| 2,924,197 | 2/1960 | Haen | 414/301 X |
| 3,175,668 | 3/1965 | Stoltzfus | 414/301 X |
| 3,269,780 | 8/1966 | Hanson | 406/162 |
| 3,349,929 | 10/1967 | Berger | 198/640 X |
| 3,422,972 | 1/1969 | Shankland | 198/640 |
| 3,446,372 | 5/1969 | Roach | 414/301 X |
| 3,485,536 | 12/1969 | Donelson, Jr. | 414/301 X |
| 3,550,108 | 12/1970 | Orlando | 340/671 |
| 3,640,409 | 2/1972 | Hanson | 414/401 X |
| 3,760,189 | 9/1973 | Jones, Jr. | 340/671 X |
| 3,834,768 | 9/1974 | Stoltzfus et al. | 406/160 |
| 3,864,984 | 2/1975 | Legille | 414/301 X |
| 3,885,684 | 5/1975 | Mitchell | 414/301 |
| 3,977,543 | 8/1976 | Weaver | 414/311 |
| 4,031,929 | 6/1977 | Cobb et al. | 239/684 |
| 4,033,466 | 7/1977 | Easton | 414/302 |
| 4,111,315 | 9/1978 | Hungerbach | 414/299 X |
| 4,205,468 | 6/1980 | Greider | 406/161 X |
| 4,395,182 | 7/1983 | Suwyn | 414/299 |

Primary Examiner—Leslie J. Paperner
Assistant Examiner—David A. Bucci
Attorney, Agent, or Firm—Michael R. Swartz; John R. Flanagan

[57] ABSTRACT

Silage distributor apparatus has an upper annular stationary member disposed about a flowing silage stream, a silage distributing chute, and a lower annular member rotatably mounted to the upper annular member for disposing the chute in the path of the flowing silage stream. A drive track in the form of a row of apertures is defined on the lower annular member and a drive sprocket is rotatably mounted on the upper annular member and disposed in driving relation with the drive track. A drive motor is removably mounted on the upper annular member and has a rotary output shaft which when the motor is mounted on the upper member is drivingly interengaged with the drive sprocket and when the motor is dismounted therefrom becomes disengaged from the drive sprocket. A sensor is connected to the motor for removal with it and has a contact finger disposed across the path of a row of pins projecting from the lower annular member. As the lower annular member is rotated relative to the upper annular member, the contact finger engages the pins one after another and generates an indication signal each time the finger engages a pin. In such manner, one can determine if the distributor apparatus is operating. Also, a silage deflector is removably mounted to the discharge end of the chute for selectively deflecting and spreading silage, and a linking rod interconnects the chute with the lower member for adjusting the chute about a horizontal axis.

26 Claims, 7 Drawing Figures

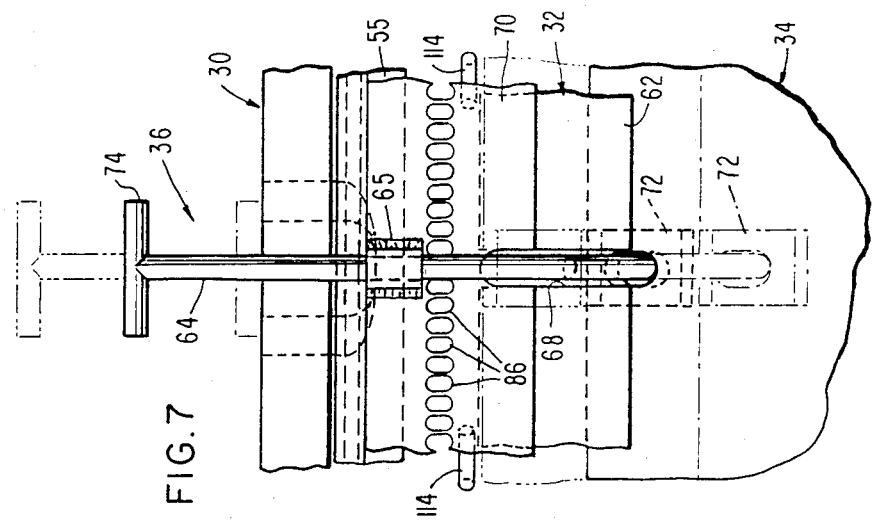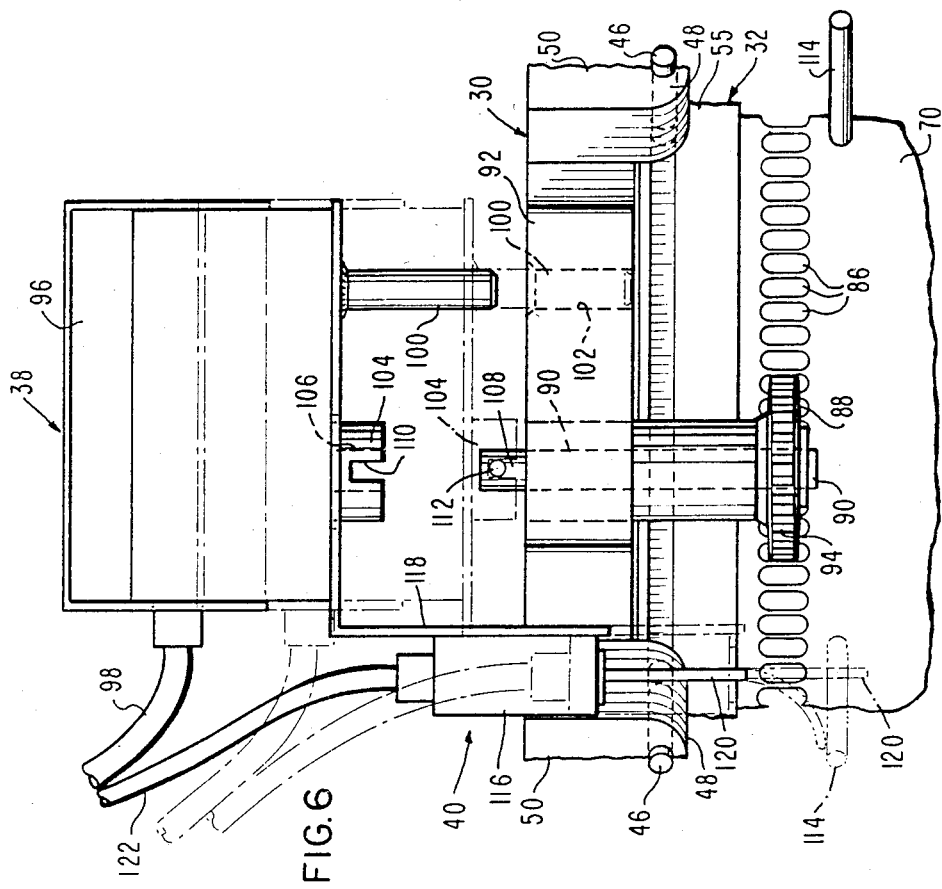

SILAGE DISTRIBUTOR APPARATUS

BACKGROUND OF THE INVENTION

1. Field of the Invention

The present invention relates to the filling of a storage facility, such as a silo, with livestock feed materials, such as silage, and more particularly, is concerned with a silage distributor apparatus operable to receive, deflect and distribute a flowing stream of silage so as to achieve a substantially uniform distribution of the constituents of the silage within the silo.

2. Description of the Prior Art

A farm silo is conventionally filled through a center opening in its roof using a discharge pipe which runs up the side of the silo and arcs over its roof to the central opening. The lower end of the pipe is connected to a silage blower into which silage is unloaded from a wagon. Thus, in the filling operation, silage is blown through the discharge pipe, out of its upper end and into the silo through its central opening.

Silage by nature is composed of large and small, heavy (dense) and light constituents. In filling the silo with blown silage, normally, the heavier or more dense constituents build up in a pile in the center of the silo, while the lighter constituents roll down to the outer periphery of the pile and accumulate along the silo wall. This is particularly true in the case of silage composed of ground ear corn. The heavier, high protein, ground kernels accumulate in the center of the silo and the lighter, lower protein, ground cobs are blown to the silo wall. Thus, a non-uniform mixture of the constituents results across the cross-section of stored silage.

This is undesirable because as the silo is unloaded later, either by a conventional top or bottom type unloader, the constituent proportions in successive portions of the silage will be different and, therefore, the portions will be non-uniform in nutritional value. Usually, and especially with the bottom unloader, silage containing more of the centrally-located, heavier and higher protein constituents will be unloaded first and thus fed to livestock early in the year, whereas silage containing more of the less nutritional and lighter material will be unloaded and fed to the livestock later in the year. The probable detrimental effects on the livestock feeding program resulting from the initial non-uniform storage of the silage are readily apparent.

Various silage distributors have been employed in the past in the upper regions of silos for distributing silage in various patterns. Representative of the prior art are the silage distributors disclosed in U.S. Patents to Stoltzfus (U.S. Pat. No. 3,175,668), Berger (U.S. Pat. No. 3,349,929), Shankland (U.S. Pat. No. 3,422,972), Donelson, Jr. (U.S. Pat. No. 3,485,536), Hanson (U.S. Pat. No. 3,640,409), Mitchell (U.S. Pat. No. 3,885,684), Hungerback (U.S. Pat. No. 4,111,315) and Suwyn (U.S. Pat. No. 4,395,182). Distributors used elesewhere are shown in U.S. Patents to Dill (U.S. Pat. No. 1,684,478), Howland (U.S. Pat. No. 1,763,396) and Weaver (U.S. Pat. No. 3,977,543). While many of these devices would appear to operate reasonably well and generally achieve their objectives under the range of operating conditions for which they were designed, most seem to embody shortcomings which make them less than an optimum mechanism for distributing silage in a uniform and reliable manner. For instance, some distributors employ a motor to rotate a silage deflector plate or blade but the motor is ordinarily fixedly anchored in place and cannot be removed except inconveniently and with some difficulty. Also, since the distributor is located high up in the silo there is no way to continuously monitor whether or not it is actually working. Knowing whether the motor is turned on or not is no guarantee that the motor is actually rotating the distributing device of the distributor. In addition, some distributors are complicated to adjust to change the pattern of distribution.

Consequently, there still exists a need for improvements which will provide an even and uniform distribution of silage while at the same time ensure reliability and facilitate maintenance of the distributor.

SUMMARY OF THE INVENTION

The present invention provides an improved silage distributor apparatus designed to satisfy the aforementioned needs. The distributor apparatus incorporates several features which enhance the service life and reliability of the apparatus and also simplify its adjustment. One feature relates to a drive mounting arrangement included in the apparatus which facilitates easy removal of the motor for storage during periods of nonuse which minimizes exposure of the motor to corrosive gases produced in the silo. Another feature is directed to a sensor which monitors whether the distributor is operating by sensing rotation of a distributing chute. Other features relate to an uncomplicated linkage for adjusting the angle of the distributing chute and a removably mounted deflector for the discharge end of the chute to alter the pattern of distribution.

Accordingly, the present is directed to a silage distributor apparatus for receiving and distributing within a silage storage facility a stream of silage flowing out of a discharge pipe into the storage facility. The silage distributor apparatus includes: (a) a first annular member stationarily disposed about the flowing silage stream; (b) a silage distributing chute; (c) a second annular member rotatably mounted to the first member about a rotational axis; (d) means interconnecting the chute to the second annular member for disposing the chute in the path of the flowing silage stream; (e) drive means intercoupling the first and second annular members for rotating the second member relative to the first member so as to align the chute to different annular positions relative to the flowing silage stream for distributing silage toward different regions of the storage facility; and (f) means for sensing rotation of the second annular member and providing indication of the same.

More particularly, the drive means includes a drive track defined on one of the first and second annular members, and a drive element rotatably mounted on the other of the first and second annular members and disposed in driving relation with the drive track. Specifically, the drive track is in the form of an endless row of apertures formed in the one of the annular members, and the drive element is in the form of a sprocket having peripheral teeth which extend through the apertures upon rotation of the sprocket and cause rotation of the one annular member relative to the other annular member. Further, the drive means includes a drive motor removably mounted on the other of the first and second annular members. The drive motor has a rotary output element which when the motor is mounted on the other of the members is drivingly interengaged with the drive element and when the motor is dismounted therefrom becomes disengaged from the drive element.

The interconnecting means includes attaching elements mounting the distributing chute to the second annular member for pivotal movement relative thereto about an axis extending transversely to the rotational axis of the second member, and an elongated linking member mounted to the second annular member for sliding movement relative thereto toward and away from the chute mounted to the second annular member. The linking member has a first element at one end thereof being connected articulately to the chute and a second element at an opposite end adapted for gripping to slide the linking member relative to the second member.

Additionally, the sensing means includes a series of spaced projections disposed on the one of the members in an endless path, and a sensor disosed on the other of the members and having a contact element disposed across the path of the projections such that as the second annular member is rotated relative to the first annular member the contact element engages the projections one after another and generates an indication signal each time the contact element engages one of the projections.

Finally, a deflector element is removably mounted to the distributing chute adjacent to a discharge end thereof. The deflector element extends across the flowing silage stream being distributed by the chute for causing spreading and deflection of portions of the silage in the stream thereof. The deflector element is normally used when filling the silo with ground ear corn so as to retard the flow of the materials through the chute to thereby prevent separation of the lighter and heavier constituents of the ground ear corn. However, generally, when filling the silo with ensilage (haylage), the deflector element is removed from the chute so as to prevent any possibility of clogging.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is an enlarged fragmentary side elevational view of the silage distributor apparatus as seen along line 6—6 of FIG. 4, showing the mounting arrangement of the drive motor and rotation sensor to the upper stationary annular member of the apparatus.

FIG. 7 is an enlarged fragmentary side elevational view of the silage distributor apparatus as seen along line 7—7 of FIG. 4, showing a linkage for adjusting the angle of the distributing chute of the apparatus relative to the horizontal mounting plane of its upper stationary annular member.

DETAILED DESCRIPTION OF THE INVENTION

Figure 1:
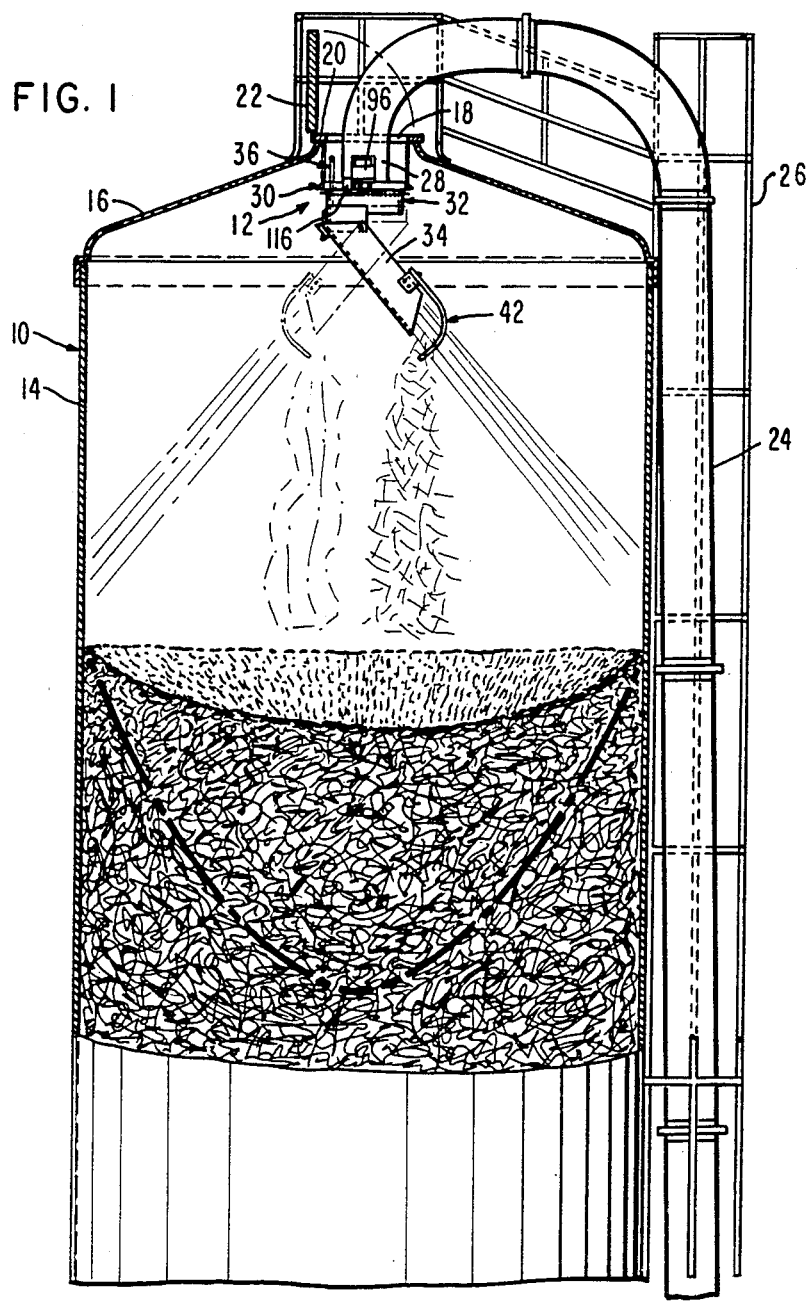
FIG. 1 is a side elevational view of the upper portion of a silo with the upper front of the silo wall broken away to reveal the silage distributor apparatus of the present invention mounted in a top central opening in the roof of the silo.

Referring now to the drawings, and more particularly to FIG. 1, there is shown the upper portion of a silage storage facility in the form of a conventional silo 10 within which is installed a silage distributor apparatus incorporating the improved features of the present invention and being generally designated 12. The silo 10 has a base (not shown), a continuous vertically-extending, cylindrical side wall 14 supported on the base, and a conical-shaped roof 16 peripherally connected with the top of the side wall 14. The roof 16 has a central opening 18 defined by an annular rim 20 which pivotally mounts a closure lid 22 and is attached on the central portion of the roof. When the lid 22 is pivoted open, as seen in FIG. 1, the central opening 18 adapts the silo 10 to be filled with silage by using a discharge pipe 24. Conventionally arranged, the pipe 24 supported by a framework 26 runs upwardly along the exterior of the silo side wall 14 and then arches over the silo roof 16 and extends into the central opening 18 therein. Thus, in the filling operation, silage is blown up through the discharge pipe 24, out its upper end 28 located just inside the silo 10 below the central opening 18 thereof.

For facilitating uniform distribution of silage constituents throughout all regions of the silo 10 during the filling operation, the improved silage distributor apparatus 12 of the present invention is employed on the silo. The distributor apparatus 12 basically includes upper and lower annular member 30,32, a silage distributing chute 34, a linking member 36, drive means 38, rotation sensing means 40 and a silage deflector element 42.

Figure 3:
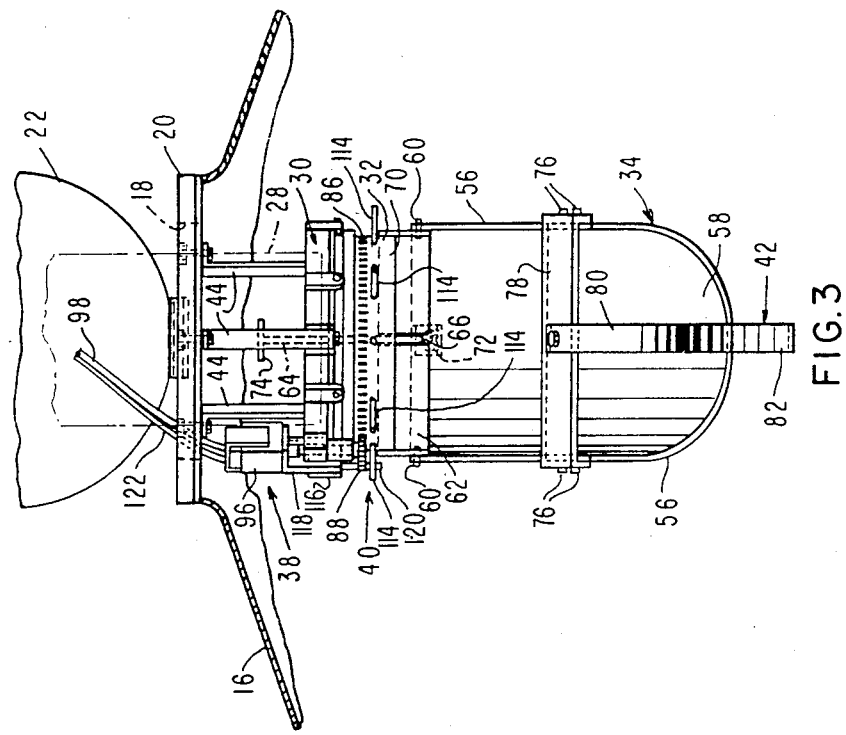
FIG. 3 is a front elevational view of the silage distributor apparatus as seen along line 3—3 of FIG. 2.

As seen in FIG. 1, and more clearly in FIGS. 2 to 4, the upper annular member 30 is stationarily disposed below the top central opening 18 of the silo roof 16 and about the flowing silage stream issuing from the upper end 28 of the discharge pipe 24 by a series of angularly spaced hangers 44 extending between and interconnecting in depending relation the annular member 30 to the annular rim 20 installed about the opening 18. Also referring to FIGS. 5 and 6, the lower annular member 32 is rotatably mounted to the upper annular member 30 by a series of spaced pins 46 mounted through lower end portions 48 of a corresponding number of lugs 50 formed on the exterior surface of the member 30, with the inner ends 52 of the pins 46 extending into a circumferential groove 54 defined on the exterior surface of an upper rim 55 of the lower annular member 32. The lower annular member 32 rotates relative to the upper member 30 about a rotational axis which is coaxial with a common vertical axis of the member.

The silage distributing chute 34 is supported by the lower annular member 32 below it and in the path of the silage stream flowing downwardly through the upper annular member 30. Specifically, the distributing chute 34 is generally U-shaped in cross section, having a pair of generally parallel side portions 56 interconnected by an arcuate bottom bight portion 58. Pivot elements 60 mount the chute 34 at the corners of the infeed end of its side portions 56 to opposite ends of a semi-cylindrical band portion 62 of the lower annular member 32. In such manner, the chute 34 is pivotally movable between the extreme positions seen in phantom in FIGS. 1 and 2, relative to the lower member 32 and about an axis defined by the pivot elements 60 which extends transversely to the rotational axis of the lower member 32.

Figure 2:
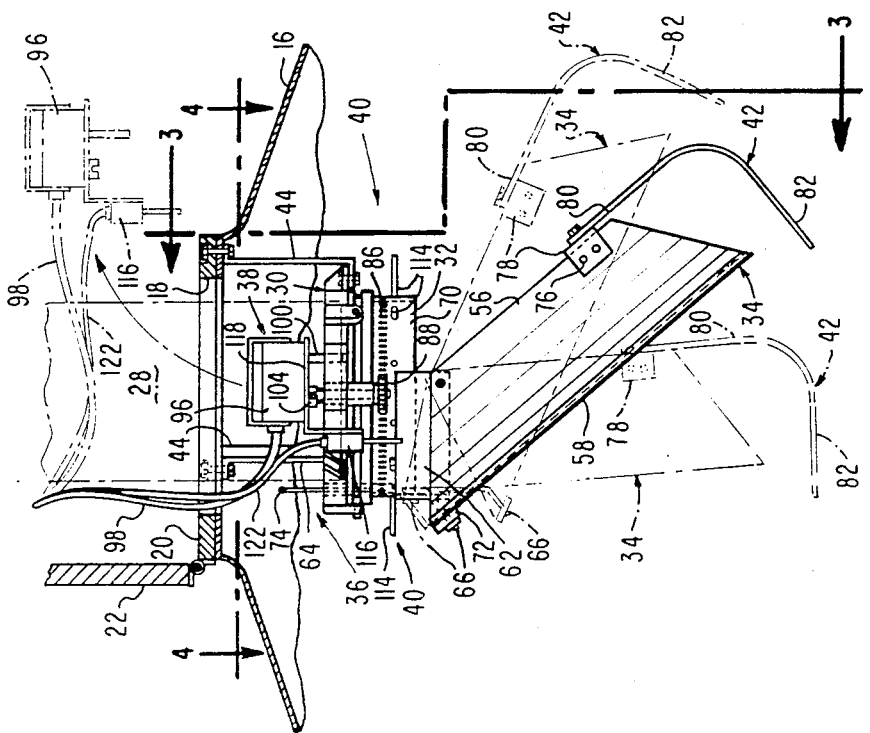
FIG. 2 is an enlarged fragmentary sectional view of the central roof portion of the silo and an enlarged side elevational view of the silage distributor apparatus in which the components thereof are depicted in greater detail.

The linking member 36 is an elongated actuating or linking rod 64 used to pivotally adjust the chute 34 between the extreme phantom positions of Fig. 2. The linking rod 64 is disposed along the interior of the lower annular member 32 and extends through a bushing 65 which is mounted, such as by welding, to the annular member 32 so as to be slidable vertically relative thereto toward and away from the chute 34. The lower end 66 of the rod 64 is bent and extends through a common slot 68 defined in the lower band 62 and in an upper cylindrical band 70 to which the lower band is attached. From the slot 68, the lower bent end 66 of the rod 64 extends through an eyelet block 72 attached on the infeed end of the chute bight portion 58. As depicted in FIG. 2, the bent end 66 of the rod 64 slides through and relative to the eyelet block 72 and causes the chute 34 to pivot about its transverse axis as the rod is moved vertically. In such manner, the rod 64 is articulately connected to the chute 34 and the annular position of the chute is adjusted. A handle 74 is formed on the upper end of the rod 64 which adapts it to be manually gripped to facilitate sliding of the rod relative to the lower annular member 32.

Material in the silage stream flowing from the discharge end of the distributing chute 34 can be deflected, spread out and directed into the center of the silo 10, as shown in FIG. 1, by the deflector element 42 which is removably mounted to the chute 34 at its discharge end by fasteners 76 and a bracket 78. More particularly, the bracket 78 is attached to and extends between the upper edges of the side portions 56 of the chute at its discharge end. The deflector element 42 is generally L-shaped, having upper and lower legs 80, 82. The upper leg 80 extends generally parallel to the side portions 56 and bight portion 58 of the chute 34 and perpendicular to the bracket 78. The lower leg 82 merges forwardly and downwardly from the upper leg 80 and extends in a generally transverse relationship to the chute 34 across the vertical center of its discharge end. Preferably, when the silo is being filled with ground ear corn, the deflector element 42 is mounted on the chute 34 so as to obstruct and slow the speed of the discharge of the material to thereby prevent separation of the lighter and heavier constituents of the material, and thus, a more even and homogenous mixture distribution of the material into the silo 10. However, when filling the silo with ensilage, the deflector element 42 is normally removed from the chute 34 to eliminate any possibility of clogging.

Figure 4:
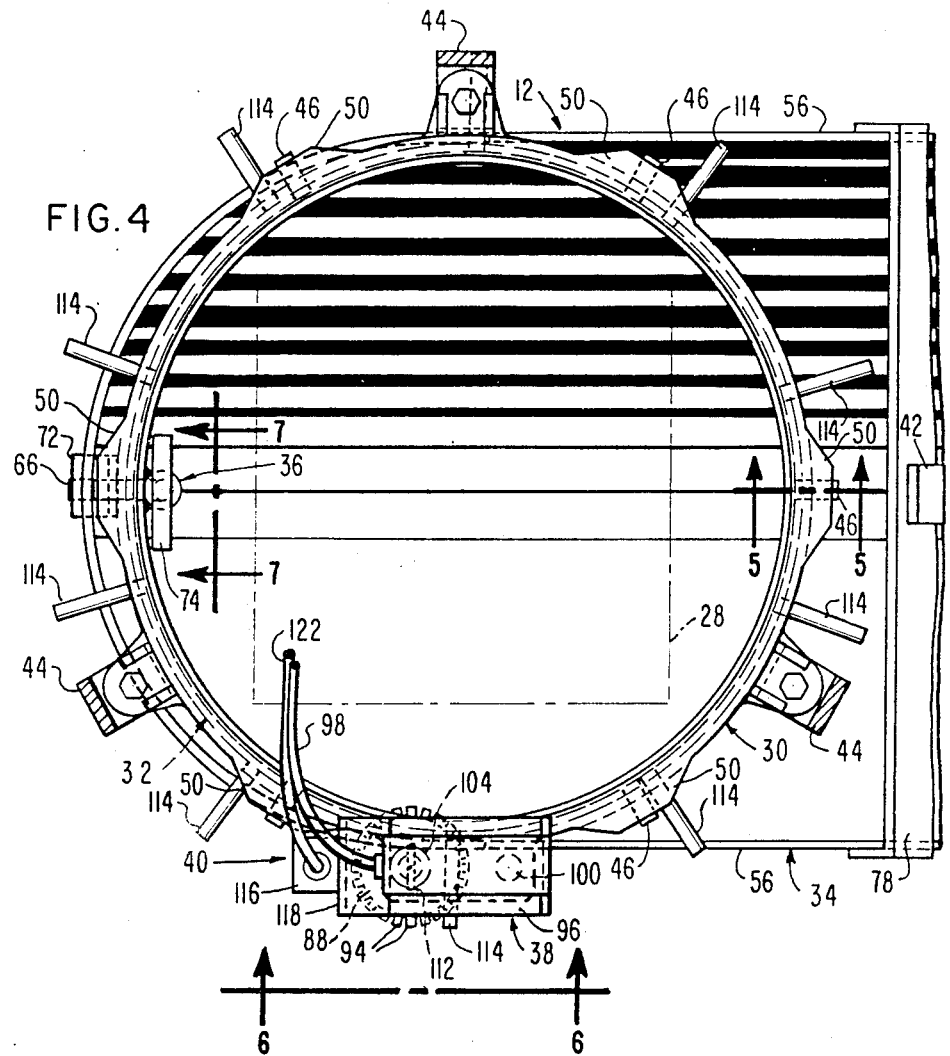
FIG. 4 is a top plan view of the silage distributor apparatus as seen along line 4—4 of FIG. 2.
Figure 5:
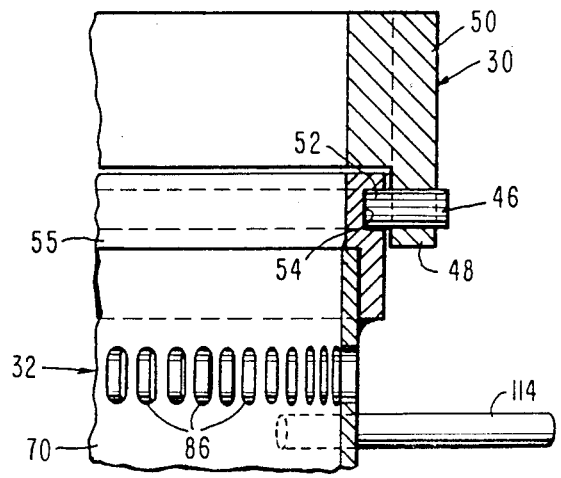
FIG. 5 is an enlarged fragmentary sectional view of the silage distributor apparatus as taken along line 5—5 of FIG. 4, showing the rotational mounting relationship of a lower movable annular member to an upper stationary annular member of the apparatus.

For moving the chute 34 to different annular positions about a vertical axis and relative to the flowing silage stream for distributing silage toward different regions of the silo 10, the drive means, generally indicated 38, is provided, being best seen in FIG. 6, but also in FIG. 4. The drive means 38 includes components which intercouple the upper and lower annular members 30,32 in a driving relationship in which the lower member 32 is rotated about the vertical axis relative to the upper member 30. First, the drive means 38 includes a drive track in the form of an endless row of spaced apertures 86 defined in the upper band 70 of the lower annular member 32. Also, a drive element in the form of a sprocket 88 is disposed in driving relation with the apertures 86 forming the drive track and is fixed to one end of a shaft 90. The shaft 90 is rotatably mounted in a vertical attitude to a block 92 which projects outwardly from the periphery of the upper annular member 30. Specifically, the sprocket 88 has peripheral teeth 94 which extend through the apertures 86 and engage the lower annular member 32 upon rotation of the shaft 90 and the sprocket 88 therewith which causes rotation of the lower member 32 relative to the upper member 30. Further, the drive means 38 includes a drive motor 96, preferably operated by electricity routed thereto via an electrical cable 98. The drive motor 96 has attached thereto nonthaeded mounting pin 100 which snugly, nonattachably and releasably fits into a bore 102 in the mounting block 92, allowing the motor 96 to be removably mounted on the upper annular member 30, as seen in FIG. 4. Also, the drive motor 96 has a rotary output element 104 with a central recess 106 adapted to receive an upper end 108 of the shaft 90 which mounts the sprocket 88. The output element 104 of the motor 96 also has a transverse slot 110 defined across it with which a transverse pin 112 in the shaft upper end 108 mates for providing a drive connection between them when the motor 96 is mounted on the block 92 of the upper annular member 30. When the motor 96 is dismounted or removed from the block 92, the pin 112 unmates from the output element slot 110 and the drive connection is thereby disengaged. Such mounting relationship of the motor 96 allows it to be removed from the harsh environment of the silo for storage during periods of nonuse which will have the beneficial result of lengthening its useful service life.

In order to accurately determine whether the distributor apparatus 12 is operating properly, the apparatus includes means 40 for sensing rotation of the lower annular member 32. The sensing means 40 includes a row of circumferentially-spaced radially-projecting pins 114 disposed on the upper band 70 of the lower annular member 32 in an endless path just below the row of apertures 86 defining the drive track. Also, a sensor 116, being attached by a bracket 118 to the drive motor 96, is disposed stationarily on the upper annular member 30 for sensing movement of the pins 114. Specifically, the sensor 116 has a depending contact finger 120 which extends across the path of the projecting pins 114 such that, as the lower annular member 32 is rotating relative to the upper annular member 30, the contact finger 120 is successively engaged by the moving pins 114. Each time the finger 120 contacts a pin 114, the sensor 116 via an electrical cable 122 generates an indication signal which will either turn on a light or actuate an audible bell or the like which can be seen or heard by the person unloading the silage.

It is thought that the silage distributor apparatus of the present invention and many of its attendant advantages will be understood from the foregoing description and it will be apparent that various changes may be made in the form, construction and arrangement of the parts thereof without departing from the spirit and scope of the invention or sacrificing all of its material advantages, the form heretobefore described being merely a preferred or exemplary embodiment thereof.

I claim:

1. Silage distributor apparatus for receiving and distributing within a silage storage facility a stream of silage flowing out of a discharge pipe into said storage facility, said silage distributor apparatus comprising:

(a) a first annular member stationarily disposed about said flowing silage stream;

(b) a silage distributing chute;

(c) a second annular member rotatably mounted to said first member about a rotational axis;

(d) means interconnecting said chute to said second annular member for disposing said chute in the path of said flowing silage stream; and (e) drive means intercoupling said first and second annular members for rotating said second member relative to said first member so as to move said chute to different angular positions relative to said flowing silage stream for distributing silage toward different regions of said storage facility;

(f) said drive means including a drive track defined on one of said first and second annular members, a support structure mounted to the other of said first and second annular members, a shaft rotatably mounted on said support structure and a drive element mounted on said shaft for rotation therewith, said shaft disposing said drive element in a drivingly engaged relation with said drive track;

(g) said drive means further including a drive motor having attached thereto a nonthreaded mounting element releasably and nonfixedly matable with a portion of said support structure for adapting said motor to be removably mounted on said other of said first and second annular members by said support structure, said drive motor also having a rotary output element which is drivingly interengaged with said shaft when said mounting element of said motor is mated with said support structure and thus said motor is mounted on said other of said members and becomes disengaged from said shaft when said mounting element of said motor is unmated from said support structure and thus said motor is dismounted from said other of said members, said drive element being maintained by said shaft in said drivingly engaged relation with said drive track regardless of whether said motor is mounted to or dismounted from said other of said first and second annular members.

2. Silage distributor apparatus as recited in claim 1, wherein said drive track is in the form of an endless row of apertures formed in said one of said annular members.

3. Silage distributor apparatus as recited in claim 2, wherein said drive element is in the form of a sprocket having peripheral teeth which extend through said apertures upon rotation of said sprocket and cause rotation of said one annular member relative to said other annular member.

4. Silage distributor apparatus as recited in claim 1, wherein said interconnecting means includes:

attaching elements mounting said discharging chute to said second annular member for pivotal movement relative thereto about an axis extending transversely to the rotational axis of said second member; and an elongated linking member mounted to said second annular member for sliding movement relative thereto toward and away from said chute mounted to said second annular member, said linking member having a first element at one end thereof connected articulately to said chute and having a second element at an opposite end adapted for gripping to slide said linking member relative to said second member.

5. Silage distributor apparatus as recited in claim 1, further comprising:

means for sensing rotation of said second annular member and generating an indication of the same.

6. Silage distributor apparatus as recited in claim 5, wherein said rotation sensing means includes:

a series of spaced projections disposed on said one of said members in an endless path; and a sensor disposed on said other of said members and having a contact element disposed across the path of said projections such that as said second annular member is rotated relative to said first annular member said contact element engages said projections one after another and generates an indication signal each time said contact element engages one projection.

7. Silage distributor apparatus as recited in claim 6, wherein said sensor is interconnected to said motor for removal therewith.

8. Silage distributor apparatus as recited in claim 1, further comprising:

a deflector element; and means mounting said deflector element to said discharging chute adjacent to a discharge end thereof and extending across the flowing silage stream being distributed by said chute for causing spreading and deflection of portions of the silage in said stream thereof.

9. Silage distributor apparatus as recited in claim 8, wherein:

said discharging chute is generally U-shaped in cross section having a pair of generally parallel side portions interconneted by a bottom bight portion; and said mounting means is a bracket mounted to and extending between said side portions of said chute in spaced relation above said bight portion thereof.

10. Silage distributor apparatus as recited in claim 9, wherein said deflector element has an upper leg connected to said bracket and a lower leg connected to said upper leg, said upper leg of said deflector element extends generally parallel to said side and bight portions of said chute and said lower leg extends in generally transverse relationship to said chute and across said discharge end thereof.

11. Silage distributor apparatus for receiving and distributing within a silage storage facility a stream of silage flowing out of a discharge pipe into said storage facility, said silage distributor apparatus comprising:

(a) a first annular member stationarily disposed about said flowing silage stream;

(b) a silage distributing chute;

(c) a second annular member rotatably mounted to said first annular member about a rotational axis;

(d) means interconnecting said chute to said second annular member for disposing said chute in the path of said flowing silage stream;

(e) drive means intercoupling said first and second annular members for rotating said second member relative to said first member so as to move said chute to different angular positions relative to said flowing silage stream for distributing silage toward different regions of said storage facility; and (f) means separately mounted on said first and second annular members and being contactable with one anothe for sensing rotation of said second annular member and generating an indication of the same;

(g) said drive means including a drive track defined on one of said first and second annular members, a support structure mounted to the other of said first and second annular members, a shaft rotatably mounted on said support structure and a drive element mounted on said shaft for rotation therewith, said shaft disposing said drive element in a drivingly engaged relation with said drive track;

(h) said drive means further including a drive motor having attached thereto a nonthreaded mounting element releasably and nonfixably matable with a portion of said support structure for adapting said motor to be removably mounted on said other of said first and second annular members by said support structure, said drive motor also having a rotary output element which is driving interengaged with said shaft when said mounting element of said motor is mated with said support structure and thus said motor is mounted on said other of said members and becomes disengaged from said shaft when said mounting element of said motor is unmated from said support structure and thus said motor is dismounted from said other of said members, said drive element being maintained by said shaft in said drivingly engaged relation with said drive track regardles of whether said motor is mounted to or dismounted from said other of said first and second annular members.

12. Silage distributor apparatus as recited in claim 11, wherein said drive track is in the form of an endless row of apertures formed in said one of said annular members.

13. Silage distributor apparatus as recited in claim 12, wherein said drive element is in the form of a sprocket having peripheral teeth which extend through said apertures upon rotation of said sprocket and cause rotation of said one annular member relative to said other annular member.

14. Silage distributor apparatus as recited in claim 11, wherein said interconnecting means includes:

attaching elements mounting said discharging chute to said second annular member for pivotal movement relative thereof about an axis extending transversely to the rotational axis of said second member;

an elongated linking member mounted to said second annular member for sliding movement relative thereto toward and away from said chute mounted said second annular member, said linking member having a first element at one end thereof being connected articulately to said chute and having a second element at an opposite end adapted for gripping to slide said linking member relative to said second member.

15. Silage distributor apparatus as recited in claim 11, wherein said sensing means includes:

a series of spaced projections disposed on said one of said members in an endless path; and a sensor disposed on said other of said members and having a contact element disposed across the path of said projections such that as said second annular member is rotated relative to said first annular member said contact element engages said projections one after another and generates an indication signal each time said contact element engages one projection.

16. Silage distributor apparatus as recited in claim 15, wherein said sensor is interconnected to said motor for removal therewith.

17. Silage distributor apparatus as recited in claim 11, further comprising:

a deflector element; and means mounting said deflector element to said discharging chute adjacent to a discharge end thereof and extending across the flowing silage stream being distributed by said chute for causing spreading and deflection of portions of the silage in said stream thereof.

18. Silage distributor apparatus as recited in claim 17, wherein:

said discharging chute is generally U-shaped in cross section having a pair of generally parallel side portions interconnected by a bottom bight portion; and said mounting means is a bracket mounted to and extending between said side portions of said chute in spaced relation above said bight portion thereof.

19. Silage distributor apparatus as recited in claim 18, wherein said deflector element has an upper leg connected to said bracket and a lower leg connected to said upper leg, said upper leg extending generally parallel to said side and bight portions of said chute and said lower leg extending in generally transverse relationship to said chute and across said discharge end thereof.

20. Silage distributor apparatus for receiving and distributing within a silage storage facility a stream of silage flowing out of a discharge pipe into said storage facility, said silage distributor apparatus comprising:

(a) an upper annular member stationarily disposed about said flowing silage stream;

(b) a silage distributing chute;

(c) a lower annular member rotatably mounted to said upper member about a rotational axis;

(d) means interconnecting said chute to said lower annular member for disposing said chute in the path of said flowing silage stream;

(e) drive means intercoupling said lower and upper annular members for rotating said lower member relative to said upper member so as to move said chute to different angular positions relative to said flowing silage stream for distributing silage toward different regions of said storage facility;

(f) said drive means including a drive track defined on said lower annular member, a support structure mounted to said upper annular member, a shaft rotatably mounted on said support structure and a drive element mounted on said shaft for rotation therewith, said shaft disposing said drive element in a drivingly engaged relation with said drive track;

(g) said drive means further including a drive motor having fixedly attached thereto only a single nonthreaded mounting pin which is releasably and nonfixably matable with and fits into a single bore defined in said support structure for adapting said motor to be removably mounted at a single location on said upper annular member by said support structure, said drive motor also having a rotary output element which is driving interengaged with said shaft when said mounting pin of said motor is mated with said bore of said support structure and thus said motor is mounted on said upper member and becomes disengaged from said shaft when said mounting pin of said motor is unmated from said bore of said support structure and thus said motor is dismounted from said upper member, said drive element being maintained by said shaft in said drivingly engaged relation with said drive track regardless of whether said motor is mounted to or dismounted from said upper annular member;

(h) means for sensing rotation of said lower annular member and generating an indication of the same, said sensing means including a row of circumferentially-spaced radially-projecting pins disposed on said lower annular member in an endless path and a sensor disposed on said upper annular member and having a contact finger disposed across the path of said projecting pins such that as said lower annular member is rotated relative to said upper annular member said contact finger engages said pins one after another and generates an indication signal each time said contact finger engages one pin; and (i) a deflector element removably mounted to said distributor chute adjacent to a discharge end thereof for causing spreading and deflection of portions of the silage in said stream thereof.

21. Silage distributor apparatus as recited in claim 20, wherein said drive track is in the form of an endless row of apertures formed in said lower annular member.

22. Silage distributor apparatus as recited in claim 21, wherein said drive element is in the form of a sprocket having peripheral teeth which extend through said apertures upon rotation of said sprocket and cause rotation of said lower annular member relative to said upper annular member.

23. Silage distributor apparatus as recited in claim 20, wherein said interconnecting means includes:

attaching elements mounting said discharging chute to said lower annular member for pivotal movement relative thereof about an axis extending transversely to the rotational axis of said lower member; and an elongated linking rod mounted to said lower annular for sliding movement relative thereto toward and away from said chute mounted to said lower annular member, said linking rod having a bent end and being connected articulately to said chute and having a handle at an opposite end adapted for gripping to slide said linking rod relative to said lower annular member.

24. Silage distributor apparatus as recited in claim 20, wherein said sensor is interconnected to said motor for removal therewith.

25. Silage distributor apparatus as recited in claim 20, wherein:

said distributing chute is generally U-shaped in cross section having a pair of generally parallel side portions interconnected by a bottom bight portion; and said mounting means is a bracket mounted to and extending between said side portions of said chute in spaced relation above said bight portion thereof.

26. Silage distributor apparatus as recited in claim 25, wherein said deflector element has an upper leg connected to said bracket and a lower leg connected to said upper leg, said upper leg extending generally parallel to said side and bight portions of said chute and said lower leg extending in generally transverse relationship to said chute and across said discharge end thereof.

* * * * *